United States Patent
Licht et al.

(10) Patent No.: US 12,535,578 B2
(45) Date of Patent: Jan. 27, 2026

(54) SENSOR DEVICE

(71) Applicant: Marelli Germany GmbH, Reutlingen (DE)

(72) Inventors: Martin Licht, Reutlingen (DE); Sebastian Döhler, Reutlingen (DE)

(73) Assignee: Marelli Germany GmbH, Reutlingen (DE)

( * ) Notice: Subject to any disclaimer, the term of this patent is extended or adjusted under 35 U.S.C. 154(b) by 535 days.

(21) Appl. No.: 18/053,023

(22) Filed: Nov. 7, 2022

(65) Prior Publication Data
US 2023/0141051 A1 May 11, 2023

(30) Foreign Application Priority Data
Nov. 8, 2021 (DE) .......................... 102021128982.3

(51) Int. Cl.
*G01S 13/931* (2020.01)
(52) U.S. Cl.
CPC ... *G01S 13/931* (2013.01); *G01S 2013/93271* (2020.01)
(58) Field of Classification Search
CPC ........ G01S 13/931; H01Q 1/42; H01Q 1/422; H01Q 15/0026; H01Q 17/00
See application file for complete search history.

(56) References Cited

U.S. PATENT DOCUMENTS

| | | | | |
|---|---|---|---|---|
| 4,701,765 A * | 10/1987 | Arduini | ...................... | H01Q 5/45 343/781 CA |
| 5,017,939 A * | 5/1991 | Wu | ......................... | H01Q 15/02 343/753 |
| 5,394,163 A * | 2/1995 | Bullen | ................... | F41G 7/2246 343/700 R |
| 6,184,842 B1 * | 2/2001 | Leinweber | ............ | B60R 13/005 156/60 |
| 7,639,206 B2 * | 12/2009 | Behdad | ................ | H01Q 21/064 333/202 |
| 8,847,835 B2 * | 9/2014 | Kuhne | ................... | H01Q 13/28 343/781 R |
| 9,024,804 B2 * | 5/2015 | Shi | ........................ | G01S 13/867 342/55 |
| 9,114,760 B2 * | 8/2015 | Mayer Pujadas | .... | H01Q 1/3283 |
| 9,812,787 B2 * | 11/2017 | Binzer | ................... | H01Q 1/422 |

(Continued)

FOREIGN PATENT DOCUMENTS

DE 19819709 A1 11/1999
DE 10239579 A1 1/2004

(Continued)

OTHER PUBLICATIONS

Search Report for German Patent Application No. 102021128982.3 dated Jul. 20, 2022.

(Continued)

*Primary Examiner* — Peter M Bythrow
(74) *Attorney, Agent, or Firm* — Howard & Howard Attorneys PLLC

(57) ABSTRACT

The invention relates to a sensor device with a sensor that is concealed by a cover for a motor vehicle and detects incoming electromagnetic waves, wherein the cover has a mount through which the incoming electromagnetic waves can pass, on at least part of which a layer is placed, characterized in that the layer is dichroic, nonmetallic, and reflective.

14 Claims, 5 Drawing Sheets

(56) References Cited

U.S. PATENT DOCUMENTS

| | | | |
|---|---|---|---|
| 9,903,999 B2 * | 2/2018 | Iordache | G02B 6/0043 |
| 10,793,093 B2 * | 10/2020 | Callewaert | H01Q 1/422 |
| 11,353,546 B2 * | 6/2022 | Sakai | H01Q 1/3233 |
| 11,427,137 B2 * | 8/2022 | Studeny | B60R 13/005 |
| 11,527,822 B2 * | 12/2022 | Doke | G01S 7/032 |
| 2003/0034933 A1 * | 2/2003 | Frenkel | H01Q 17/00 |
| | | | 343/872 |
| 2005/0134959 A1 * | 6/2005 | Simpson | H05K 9/0096 |
| | | | 359/359 |
| 2007/0210979 A1 * | 9/2007 | Shingyoji | H01Q 17/001 |
| | | | 343/711 |
| 2009/0273527 A1 * | 11/2009 | Behdad | H01Q 15/0026 |
| | | | 343/705 |
| 2011/0273356 A1 * | 11/2011 | Kawaguchi | H01Q 1/44 |
| | | | 204/192.27 |
| 2012/0119961 A1 * | 5/2012 | Mayer Pujadas | B60R 13/005 |
| | | | 427/455 |
| 2014/0062114 A1 * | 3/2014 | Gaboury | B60R 13/005 |
| | | | 296/1.08 |
| 2014/0091969 A1 * | 4/2014 | Shi | G01S 13/02 |
| | | | 342/385 |
| 2015/0086731 A1 * | 3/2015 | Sugiura | B32B 37/18 |
| | | | 156/196 |
| 2016/0152834 A1 * | 6/2016 | Yoshinaga | C09D 7/61 |
| | | | 428/208 |
| 2017/0036594 A1 * | 2/2017 | Roberts | F21S 45/50 |
| 2017/0057424 A1 * | 3/2017 | Yamada | G01S 13/931 |
| 2017/0168137 A1 * | 6/2017 | Cho | G01S 13/931 |
| 2018/0207900 A1 * | 7/2018 | Kosugi | B60R 19/52 |
| 2018/0215086 A1 * | 8/2018 | Geise | B29C 45/1671 |
| 2019/0103042 A1 * | 4/2019 | Schöne | G09F 21/04 |
| 2019/0288383 A1 * | 9/2019 | Shiozaki | H01Q 1/42 |
| 2019/0356046 A1 * | 11/2019 | Mayer Pujadas | B60Q 1/0011 |
| 2020/0124701 A1 * | 4/2020 | Takahashi | G01S 17/931 |
| 2020/0339053 A1 * | 10/2020 | Bicego | G01S 13/931 |
| 2020/0371203 A1 * | 11/2020 | Hirotani | B60R 13/005 |
| 2021/0344110 A1 * | 11/2021 | Caruso | H01Q 1/422 |
| 2022/0024374 A1 * | 1/2022 | Studeny | B60R 13/005 |
| 2022/0163632 A1 * | 5/2022 | Kobayashi | G01S 7/4047 |
| 2022/0404539 A1 * | 12/2022 | Bajec Strle | G02B 6/0035 |
| 2023/0221481 A1 * | 7/2023 | de Mersseman | G01S 17/931 |
| | | | 342/52 |
| 2023/0243961 A1 * | 8/2023 | Renaud | H01Q 1/3233 |
| | | | 342/455 |

FOREIGN PATENT DOCUMENTS

| | | |
|---|---|---|
| DE | 102013217391 A1 | 3/2014 |
| DE | 102015003207 A1 | 9/2016 |
| DE | 102016009549 A1 | 3/2017 |
| DE | 102017214129 A1 | 2/2019 |
| JP | 2002135030 A | 5/2002 |
| WO | 2019038107 A1 | 2/2019 |
| WO | 2021249806 A1 | 12/2021 |

OTHER PUBLICATIONS

Crouch, Jonathan, "Peugeot e-2008 review", RAC, https://www.rac.co.uk./drive/car-reviews/peugeot/e-2008/e-2008/ (5 pages) (Apr. 20, 2020) (retrieved Jul. 19, 2022).

Omnique, "Omnique Opal" Datenblatt, https://www.omniquedesign.com/products/opal (7 pages) (retrieved Jul. 19, 2022).

Ric, Didier, et al., "Peugeot e-208 (2019): la nouvelle 208 électrique en détail", L'argus Bearbeitungsstand, https://www.largus.fr/geneveve/peugeot-e-208-2019-la-nouvelle-208-electrique-en-detail-9643391.html (7 pages) (Jul. 16, 2019) (retrieved Jul. 19, 2022).

Ric, Didier, et al., "Peugeot e-208 (2019): la nouvelle 208 électrique en détail", L'argus Bearbeitungsstand, https://www.largus.fr/geneveve/peugeot-e-208-2019-la-nouvelle-208-electrique-en-detail-9643391-11624384-photos.html#photos-main-title-anchor (8 pages) (Jul. 16, 2019) (retrieved Jul. 19, 2022).

Rosskothen, Silke, "Peugeot 308: Die Geheimnisse des neuen High-Tech-Emblems", Pressemitteilung von Stellantis, https://www.media.stellantis.com/de-de/peugeot/press/peugeot-308-die-geheimnisse-des-neuen-high-tech-emblems (3 pages) (Feb. 9, 2022) (retrieved Jul. 19, 2022).

UltrashieldX, "Dichroic Glass Films" Datenblatt, https://www.ultrashieldx.com/dichroic-glass-films/ (3 pages) (retrieved Jul. 19, 2022).

* cited by examiner

SENSOR DEVICE

CROSS-REFERENCE TO RELATED APPLICATIONS

The present application claims priority to and all the benefits of German Patent Application No. 102021128982.3, filed on Nov. 8, 2021, which is hereby expressly incorporated herein by reference in its entirety.

BACKGROUND OF THE INVENTION

1. Field of the Invention

The invention relates to a sensor device that has a sensor concealed by a cover on a motor vehicle.

2. Description of the Related Art

A radiator grill for motor vehicles can contain a cover for sensors. In the field of radar system sensors these covers are referred to as radomes. DE 10 2015 003 207 A1 discloses such a radome. This relates to a radar distance measuring device in an adaptive cruise control or automatic parking system placed behind a decorative device on a motor vehicle. The decorative device is located in the middle of the radiator grill. The decorative device comprises a lighting unit that comprises a light emitting diode. The decorative device also comprises a decorative element made of metal.

WO 2019/038107 A1 discloses a backlit radome. The radome contains a decorative coating. This coating is produced in a hot stamping process or by applying a metallized film or chrome paint, or through physical vapor deposition (PVD) of metals such as indium, gold or tin.

A disadvantage with metallic applications is that these metals have a negative effect on the radar performance. Furthermore, the efficiency of the lighting of the metallic layer is relatively poor due to the low transmission thereof.

SUMMARY OF THE INVENTION

The object of the invention is to create a sensor device with a sensor cover, at least part of which exhibits a polished metallic surface, the functioning of which is impaired as little as possible.

In the case of a sensor device according to the invention, which has a sensor concealed by a cover for a motor vehicle, and which detects incoming electromagnetic waves, the cover has a mount through which the incoming waves can pass, on at least part of which a dichroic, nonmetallic, and reflective layer is placed.

The dichroic, reflective layer forms a color filter that is not only perceived as being reflective, but also only reflects certain wavelengths of the visible light spectrum. Other wavelengths can pass through this layer.

The functioning of the dichroic layer is based on light wave interference. The dichroic layer is nonmetallic and is composed of numerous thin layers of dielectric material, which have a significantly lower effect on radar beams, blocking them much less than metallic layers. The dichroic layer can be applied directly to the mount. The mount can be made of plastic, in particular. The radar waves can consequently pass through both the dichroic layer and the mount, such that they can then be detected by the sensor.

The contours or shape of the cover can be clearly illuminated, and the cover can still have an attractive appearance when it is not lit. This means that the lighting can be such that it is not apparent, even after it is shut off. For this, visible light can exit the mount toward the dichroic layer, such that this light distribution propagates in the dichroic layer, and then exits the dichroic layer.

In order to sharply focus the contours of the illuminated dichroic layer, such that it is clearly distinguished from the rest of the cover, an absorbing layer can be placed on the mount adjacent to the dichroic layer, which absorbs visible light exiting the mount, and transmits the incoming waves.

To ensure that at least 5% of the visible light from the light source is still transmitted by the dichroic layer, the dichroic layer can exhibit a reflection R that is greater than 80% and less than 95% in the visible light spectrum.

To obtain an inexpensive, uniform lighting through the mount, the mount can comprise a substantially planar waveguide plate, into the front surface of which the visible light can be projected by a light source, part of which is reflected at the boundary surfaces of the waveguide plate and within the waveguide plate, and part of which exits and enters one side of the dichroic layer, and then exits the other side of the dichroic layer.

In order to keep the light away from the part of the cover plate that is not to be lit, the mount can be composed of at least two parts and comprise two waveguide plates, the second of which is located between the first waveguide plate and the dichroic layer, with gaps being formed between the two waveguide plates, at least in portions of the area therebetween, such that less light enters the second waveguide plate from the first waveguide plate where there is a gap than if there were no gap.

To make the cover plate lighting more efficient, at least one waveguide web can be placed next to the gap, through which the visible light is transmitted with a greater transmission T between the two waveguide plates than through the gap.

To further increase the efficiency of the cover plate lighting, and focus the light more accurately onto the dichroic layer, it may be the case that the dichroic layer is located in the region of the waveguide web, and/or the region where the gap is located is covered by the absorbing layer on an outer surface of the second waveguide plate, facing away from the first waveguide plate.

To obtain a homogenous illumination of the cover plate, the spacing formed by the gap between the two waveguide plates can be uniform, such that the light distribution from the first waveguide plate to the second waveguide plate is homogenous. The gap can be filled with a medium that has a lower refractive index than the medium from which the waveguide plates are made. The relative permittivities $\varepsilon_r$ of the two media can be approximately the same. The gap can be filled with air or a transparent film.

To extract the light from the light source exiting the cover plate in a targeted manner, the dichroic layer can comprise a band-pass filter, which has a greater transmission or lower reflection for wavelengths of the light that can be emitted by the light source than for wavelengths that are greater or smaller than the wavelengths that can be emitted by the light source.

To keep the spectral range of the reduced reflection with a band-pass filter as narrow as possible, and thus keep the range of relatively strong reflection broad, the light source can be a laser diode.

To be able to mix the light that can be perceived from the outside coming from light emitting diodes of different colors, or to make the cover appear to have different colors, the band-pass filter can have a greater transmission in a first range and second range of visible light wavelengths than in a third range, the wavelengths of which lie between the wavelengths of the first and second ranges.

The cover of the present invention can be employed particularly advantageously as a radome for a radar sensor. The sensor can also be a lidar sensor or an infrared sensor, or a "thermal-imaging camera," which functions outside the visible light spectrum.

Further features, application possibilities, and advantages of the invention can be derived from the following description of exemplary embodiments of the invention, which shall be explained in reference to the drawings.

DETAILED DESCRIPTION OF THE INVENTION

Figure 1:
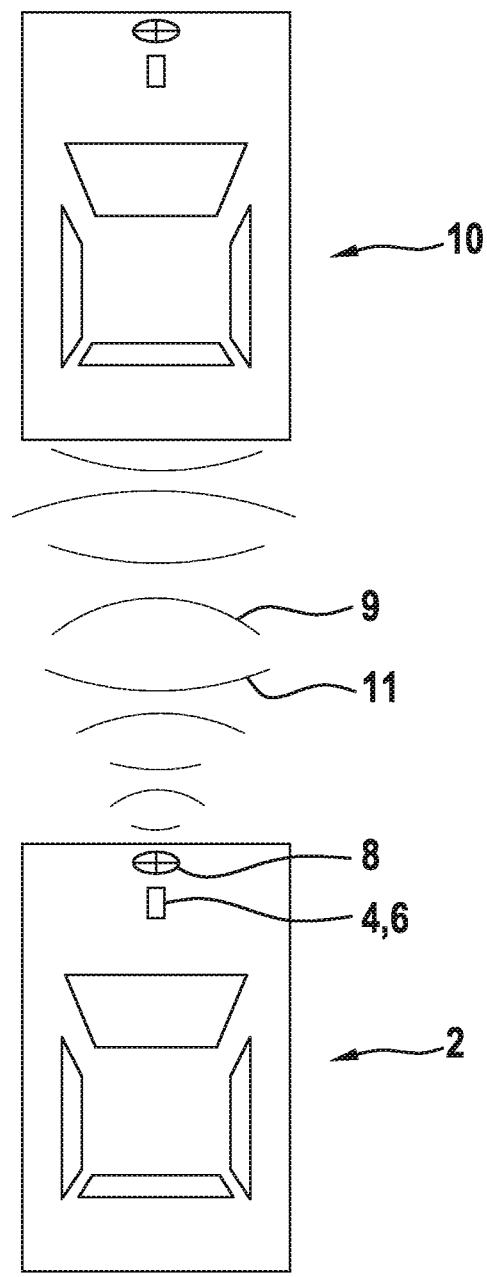
FIG. 1 shows a schematic illustration of two vehicles from above, one behind the other, each of which has a cover for a sensor.

FIG. 1 shows a motor vehicle 2 with a radar system at the front that has a transmitter 4 and a sensor device. The sensor device comprises a receiver, or sensor 6, which is concealed by a cover 8 on the motor vehicle. The decorative cover 8 may include a trademark from the vehicle manufacturer, for example, and is located in front of the sensor 6. The cover 8 can be integrated in particular in a front trim panel made of plastic or in a bumper. With motor vehicles that have internal combustion engines in particular, the cover 8 can be integrated in a radiator grill.

The cover 8 is a radome, which allows radar waves 9 to be transmitted by the transmitter 4, which have a frequency of 75 to 78 GHz in motor vehicles. The radar waves reflected back by a metallic object in front of the vehicle, in particular another vehicle 10, are detected with the sensor 6. Incident waves 11 are also detected by the sensor 6. The distance to the metallic object is determined from the transit time of the respective radar waves. The dimensions of the object can be determined with focused radar waves.

Figure 2:
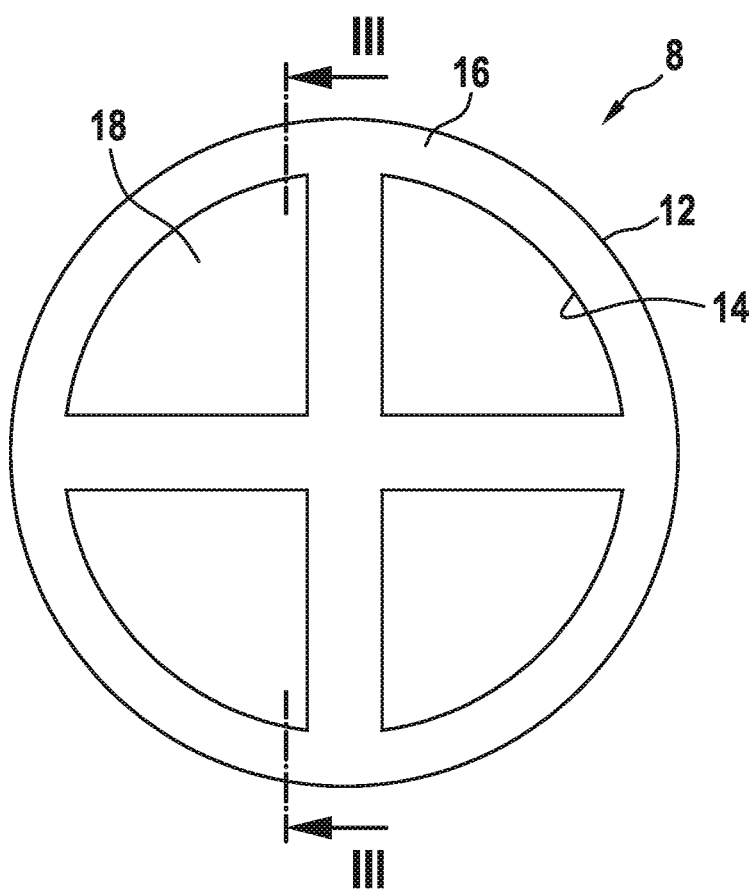
FIG. 2 shows the cover from FIG. 1, from above.

FIG. 2 shows the cover from FIG. 1 from above, which can be formed to resemble a trademark or emblem of the vehicle manufacturer in particular. The cover 8 has contours 12, 14, which delimit at least one highly reflective surface 16 from at least one less reflective surface 18. The highly reflective surface 16 can have a polished metallic appearance. The less reflective surface 18 does not have a polished metallic appearance. Instead, this surface 18 can be the same color as the vehicle, or it can be black. This surface 18 can also be the color of the manufacturer's trademark. This colored, black, or white surface 18 can be matte or glossy.

Figure 3:
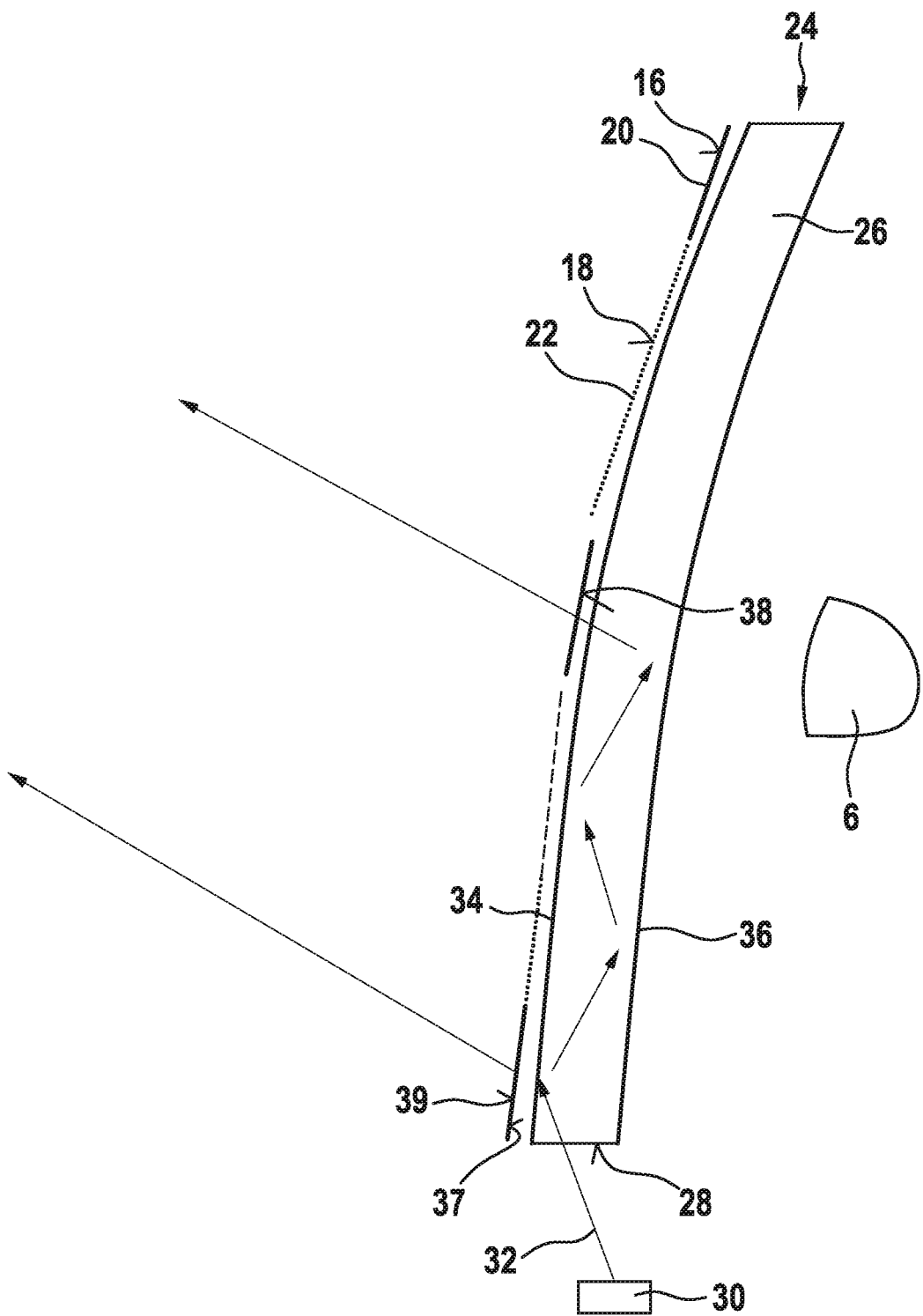
FIG. 3 shows the cover cut along the line III-III in FIG. 2, with a dichroic layer on the cover.

FIG. 3 shows the cover with the sensor 6 behind it in the direction of travel, from the side, cut along line III-III in FIG. 2. The highly reflective surface 16 is formed on a nonmetallic, reflective and dichroic layer 20. The dichroic layer 20 comprises numerous dielectric layers applied to the mount 24, which have a relatively low permittivity $\varepsilon_r$, compared to metallized layers. The refractive index for a medium n is derived as follows from the square root of the relative permittivity Er:

$$n = \sqrt{\varepsilon_r}$$

The relative permittivity $\varepsilon_r$ of the dielectric layers therefore lies within the range of 1 to 4. Metallic layers normally have a relative permittivity of $\varepsilon_r > 5$. The tangent of the dielectric loss angle $\delta$ in the dielectric layers is also relatively low compared to that of the metallic layers. The dielectric loss angle $\delta$ is a measure for the dielectric and ohmic losses in a medium. The tangent of the dielectric loss angle $\delta$ in dielectric layers is therefore defined as tan $\delta < 0.01$.

With regard to the transparency for radar systems, low values of $\varepsilon_r$ and tan & tend to be more advantageous. Because the dichroic layer 20 eliminates the need for a metallic layer, this results in a reduction in the interferences for the sensor located behind it, in particular for radar waves.

The less reflective surface 18 is formed on an absorbing layer 22, which is in the form of a film or a coating. The two layers 20, 22 are applied or glued to a mount 24. The mount 24 comprises a substantially planar waveguide plate 26 with a slight three dimensional spatial form. The waveguide plate 26, or mount 24 is arched or bowed in particular. Alternatively, the waveguide plate 26 can also be planar. Visible light can enter the front surface 28 of the waveguide plate 26 from a light source 30, indicated by a light beam 32 in the drawing. Part of the light beam 32 is reflected on boundary surfaces 34, 36 of the waveguide plate 26 and within the transparent waveguide plate 26, and part of the light exits and enters one side 37 of the dichroic layer 20. The light beam 32 then exits the other side 39 of the dichroic layer 20. Furthermore, a light distribution of visible light can exit the mount 24 toward the dichroic layer 20, such that the light distribution propagates in the dichroic layer 20, and then exits the dichroic layer 20. The light source 30 can be switched on and off. This makes it possible to create the emblem shown in FIG. 2, such that the surface 16 generates a metallic reflective appearance when it is not lit, while its less reflective surface 18 remains dark. When the light source 30 is switched on, the surface 16 appears to be lit.

The two layers 20, 22 shown in FIG. 3 abut one another on the waveguide plate 26. In an alternative embodiment, not shown, the two layers 20, 22 overlap slightly, such that the absorbing layer 22 then preferably overlaps the dichroic layer 20, because the material that the mount 24 or the waveguide plate 26 is made from is selected such that the dichroic layer 20 adheres particularly well to this surface.

Figure 4:
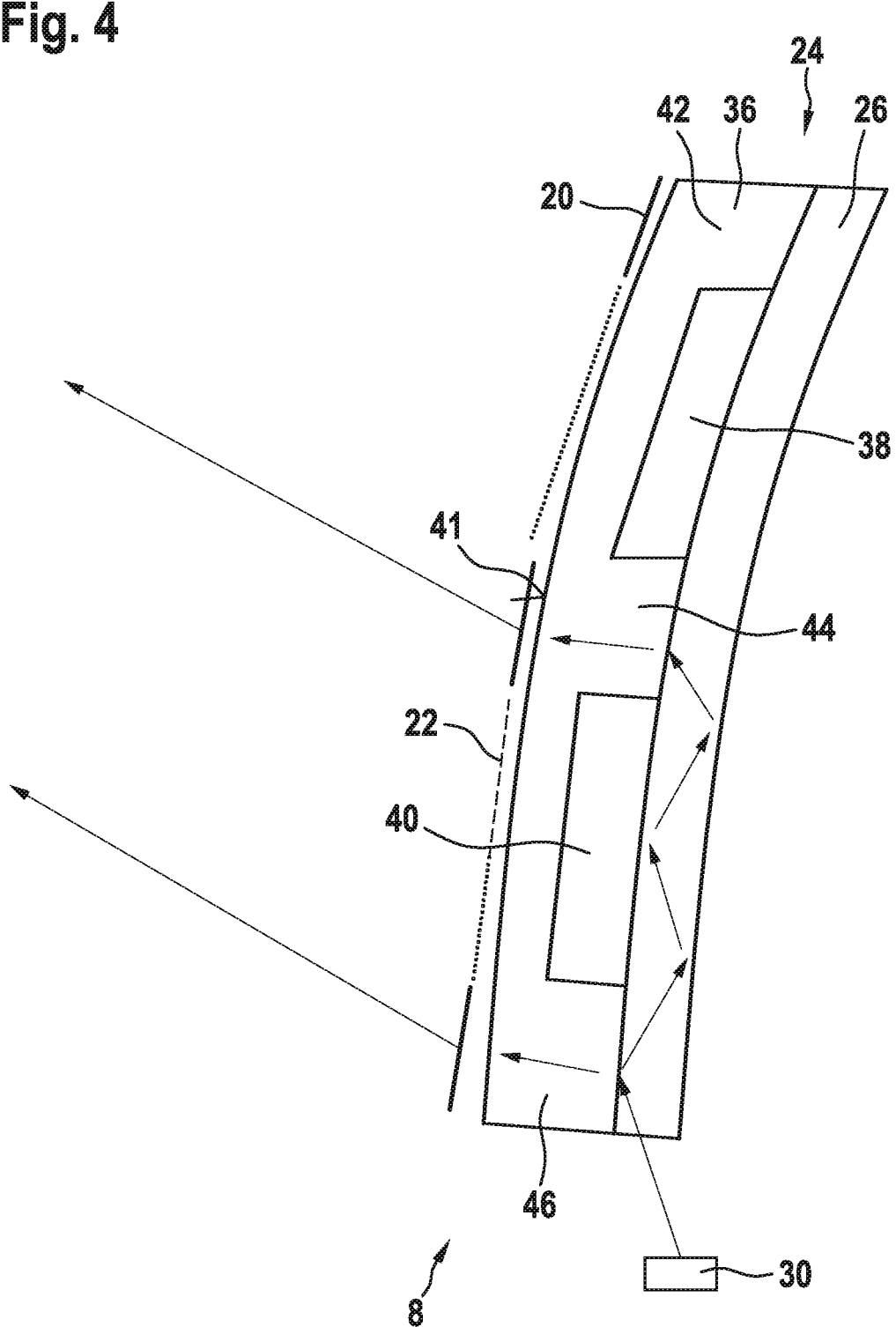
FIG. 4 shows an alternative embodiment of the cover in an illustration analogous to FIG. 3.

FIG. 4 shows another alternative embodiment in which the mount 4 is made from two parts, and therefore comprises two waveguide plates 26, 36. The second waveguide plate 36 is placed between the first waveguide plate 26 and the dichroic layer 20. Gaps 38, 40 are formed in portions of the area between the two waveguide plates 26, 36, where less light exits the first waveguide plate 26 into the second waveguide plate 36 than if there were no gap 38, 40.

There are waveguide webs 42, 44, 46 next to the gaps 38, 40, through which visible light can be transmitted between the two waveguide plates 26, 36 with a higher transmission T than through the gaps 38, 40 that are surrounded by the waveguide webs 42, 44, 46. The waveguide webs 42, 44, 46 are formed as an integral part of the second waveguide plate 36 and come in contact with the first waveguide plate 26, such that the gaps 38, 40 are formed by recesses in the second waveguide plate 36. The shape of the second waveguide plate 36 corresponds to the shape of the first waveguide plate 26 and is also spatially curved in this regard.

The gaps 38, 40, or recesses, are filled with air or a transparent film. The mount can also be made of polycarbonate (PC) and the filler can be poly(methyl methacrylate) (PMMA).

As in FIG. 2, the dichroic layer 20 is placed on the mount 24. This dichroic layer 20 is placed on an outer surface 41 of the second waveguide plate 36 facing away from the first waveguide plate 26, in the region of the waveguide webs 42, 44, 46. The gaps 38, 40 are also concealed on this outer surface 41 by the absorbing layer 22.

In the exemplary embodiment in FIG. 4, the efficiency of the lighting by the light source 30 is higher than in the exemplary embodiment in FIG. 3. A large portion of the light from the light source 30, which is converted to heat by the absorbing layer 22 in the exemplary embodiment in FIG. 3 is still available for lighting purposes in the exemplary embodiment shown in FIG. 4.

In order to illuminate the cover plate 8 homogenously, instead of two gaps 38, 40, there can be a single gap with a uniform depth, such that the waveguide plates are spaced apart at a uniform distance. In this exemplary embodiment, not shown, the gap prevents direct contact between the two waveguide plates. The gap can then be filled with air or some other filler, such as a transparent film, as is the case in FIG. 4. The filler has a refractive index in this case that is lower than that for the medium from which the waveguide plates are made.

The efficiency of the lighting can be improved when the dichroic layer 20 in all of the embodiments described above has a band-pass filter, which has a higher transmission level for those wavelengths, or spectral range, of the light source 30 than for the wavelengths lying outside this spectral range.

Figure 5:
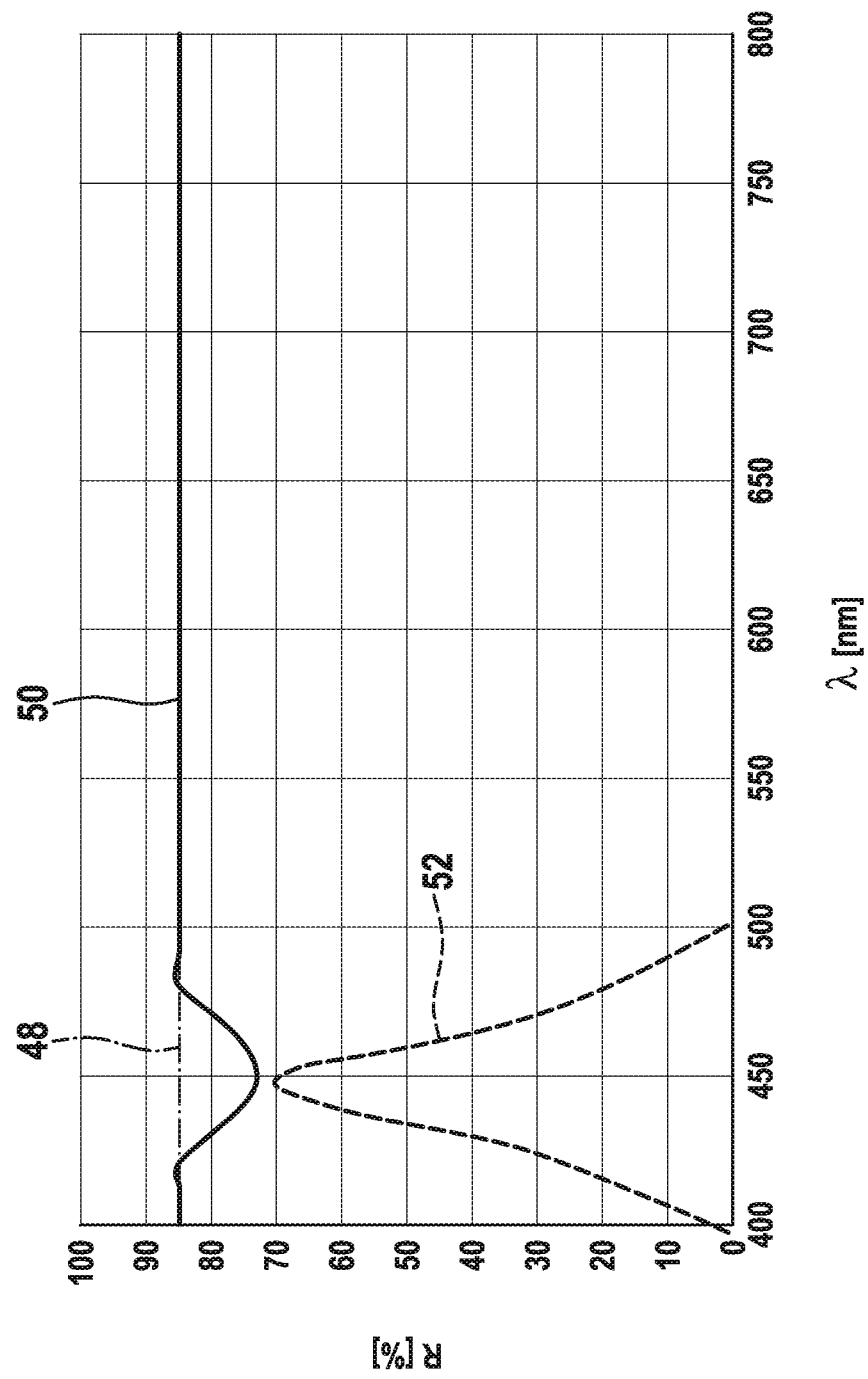
FIG. 5 shows a graph for a dichroic layer with a band-pass filter.

FIG. 5 shows a schematic graph for such a band-pass filter, in which the reflection R of the dichroic layer with a band-pass filter is plotted over the wavelengths. The reflection R is given in percentages.

The broken line 48 indicates a continuous reflection R of 85%, which is obtained without a band-pass filter on the dichroic layer. The reflection R=85% therefore lies within the preferred range of a reflection R from 80% to 95%, with which it is ensured that at least 5% of the visible light is still transmitted by the dichroic layer 20.

The broken line 48 is largely covered in the graph by a continuous line 50, which indicates the reflection with a band-pass filter, the reflection of which is reduced in a wavelength range of 420 nm to 480 nm, and has a minimum at a wavelength of 2=450 nm. In this case, the band-pass filter is adjusted to the emission spectrum of a blue light emitting diode, the spectral range, or wavelengths of which are indicated by the curve 52 in the graph.

The wider and deeper the reflection of the band-pass filter falls within the spectral range of the light emitting diode, the more the color impression of the overall reflection is displaced for the observer toward complementary colors of the light emitting diode. In the present exemplary embodiment, the color impression of the overall reflection is displaced to the complementary color for blue, which is greenish-yellow. The dichroic layer 20 in this case would be perceived as a yellowish-green reflection outside the motor vehicle 2.

To increase the efficiency of the lighting even more, a light source 30 can be selected that has a particularly narrow spectral range. A laser diode is such a light source 30, for example. The spectral range or curve 52 with such a laser diode extends over only a few nanometers. With a blue laser diode, the spectral range does not extend over a spectral range of 100 nm (400 nm to 500 nm) over the curve 52, but instead exhibits a smaller spectral range of 45 nm, by way of example.

The reflection of the dichroic layer 20 is as low as possible over a narrow spectral range in this narrow spectral range, or over precisely these wavelengths. As a result, the visible light from the light source 30 is transmitted very efficiently, while much of the external light in the visible light spectrum, in particular sunlight, is reflected by the dichroic layer.

In an alternative embodiment, a multi-band-pass filter is used. With this multi-band-pass filter, the reflection takes place along the x-axis in two separate spectral ranges. As a result, the multi-band-pass filter is optimized for two different light sources or two different spectral ranges.

By way of example, the reflection can decrease not only in the spectral range of the blue laser or light emitting diode, but also in the spectral range of a yellow laser or light emitting diode, such that by combining the blue and yellow light, a white light is obtained.

The cover 8 does not have to be a radome. The cover 8 can also be used with other sensors 6 that detect electromagnetic waves, which are not supposed to be affected, at all or very much, by the dichroic layer 20. Examples of such sensors are lidar sensors or infrared cameras, or "thermal-imaging cameras," which function outside the visible spectrum.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A sensor device for a motor vehicle, said sensor device comprising: a sensor that is concealed by a cover and that detects incoming electromagnetic waves, wherein the cover has a mount through which the incoming electromagnetic waves can pass, on at least part of which a layer is placed, wherein the layer is dichroic, nonmetallic, and reflective;
    wherein a light distribution of visible light can exit the mount toward the dichroic layer such that the light distribution propagates in the dichroic layer and exits the dichroic layer;
    said dichroic layer including a plurality of dielectric layers applied to the mount and having a permittivity $\varepsilon_r$ of 1 to 4.

2. The sensor device as set forth in claim 1, wherein an absorbing layer is located on the mount next to the dichroic layer, which
    absorbs visible light exiting the mount, and
    transmits the incoming electromagnetic waves.

3. The sensor device as set forth in claim 2, wherein the dichroic layer has a reflection R in the wave range of the visible light that is greater than 80% and less than 95%.

4. The sensor device as set forth in claim 1, wherein the mount comprises a primarily planar waveguide plate, onto the front surface of which the visible light can be projected with a light source, part of which is reflected on the boundary surfaces of the waveguide plate and inside the waveguide plate, and part of which exits into one side of the dichroic layer and then exits the other side of the dichroic layer.

5. The sensor device as set forth in claim 4, wherein the mount is composed of at least two parts and comprises two waveguide plates, of which the second waveguide plate is located between the first waveguide plate and the dichroic layer, wherein there is a gap in a least a portion of the area between the two waveguide plates, such that less light exits the first waveguide plate into the second waveguide plate at the gap than if there were no gap.

6. The sensor device as set forth in claim 5, wherein at least one waveguide web is located next to the gap, at which the visible light is transmitted between the two waveguide plates at a higher transmission T than through the gap.

7. The sensor device as set forth in claim 6, wherein the dichroic layer is located in the region of the waveguide web, and/or
   the portion of the area of the gap is concealed by an absorbing layer on an outer surface of the second waveguide plate facing away from the first waveguide plate.

8. The sensor device as set forth in claim 5, wherein the gap separates the two waveguide plates at a uniform distance, such that the light distribution from the first waveguide plate to the second waveguide plate is homogenous.

9. The sensor device as set forth in claim 5, wherein the gap is filled with a medium that has a lower refractive index than the medium from which the waveguide plates are made, and the relative permittivities (Er) of the two media are approximately the same.

10. The sensor device as set forth in claim 4, wherein the dichroic layer comprises a band-pass filter that has a higher transmission T for wavelengths of the light emitted by the light source than for wavelengths that are greater and smaller than the wavelengths emitted by the light source.

11. The sensor device as set forth in claim 4, wherein the light source is a laser diode.

12. The sensor device as set forth in claim 10, wherein the band-pass filter has a higher transmission in a first and second range of wavelengths of visible light than in a third range, the wavelengths of which lie between the wavelengths of the first and second ranges.

13. The sensor device as set forth in claim 1, wherein the sensor is a radar sensor, lidar sensor, or infrared sensor.

14. The sensor device as set forth in claim 13, wherein the cover is a radome, and the wavelengths of the incoming electromagnetic waves lie outside those of visible light.

* * * * *